Nov. 15, 1960 R. A. MEYERS 2,959,842
TUBE SCARFING DEVICE
Filed Dec. 6, 1957 3 Sheets-Sheet 1
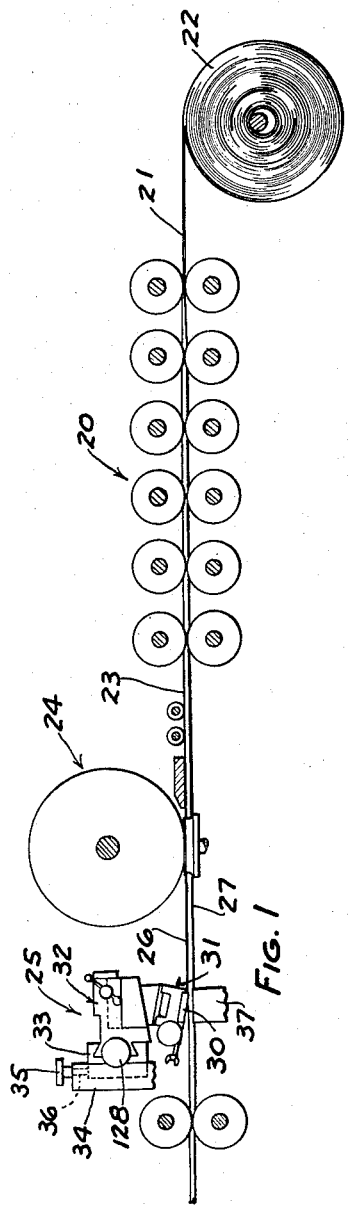
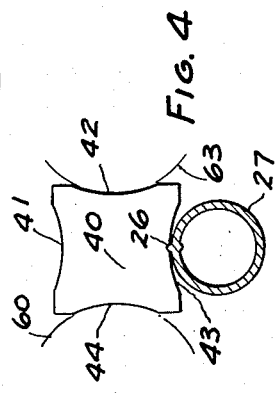
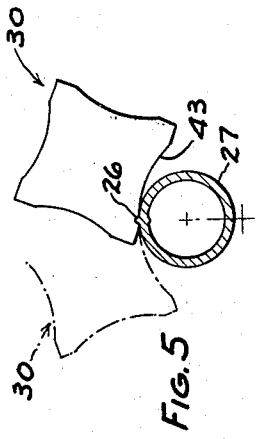
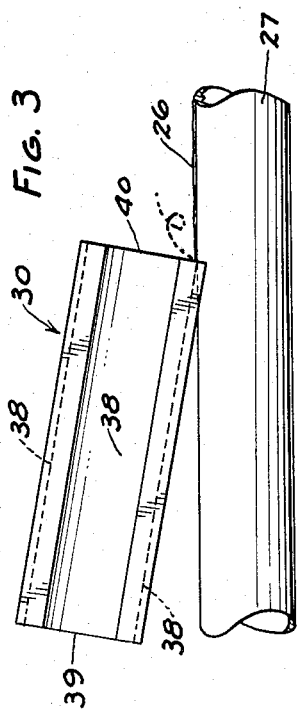
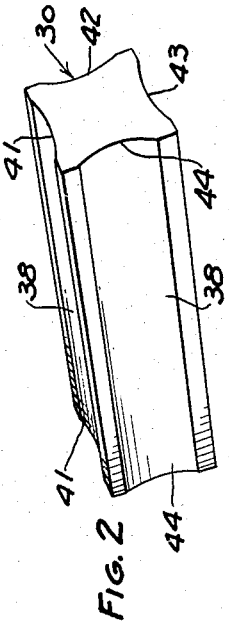
INVENTOR.
RICHARD A. MEYERS
BY
Barnes, Kisselle, Raisch & Choate
ATTORNEYS

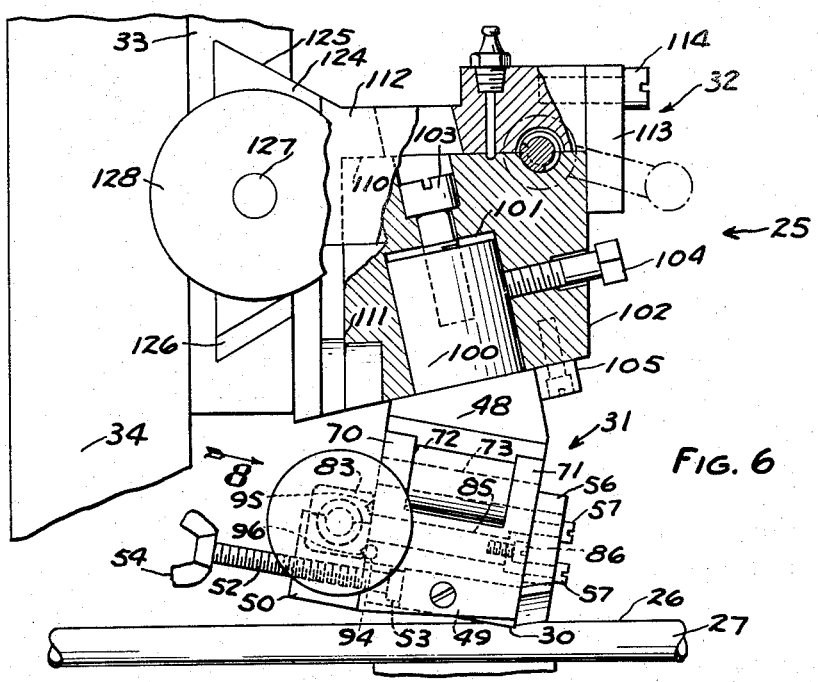

Nov. 15, 1960  R. A. MEYERS  2,959,842
TUBE SCARFING DEVICE
Filed Dec. 6, 1957  3 Sheets-Sheet 3
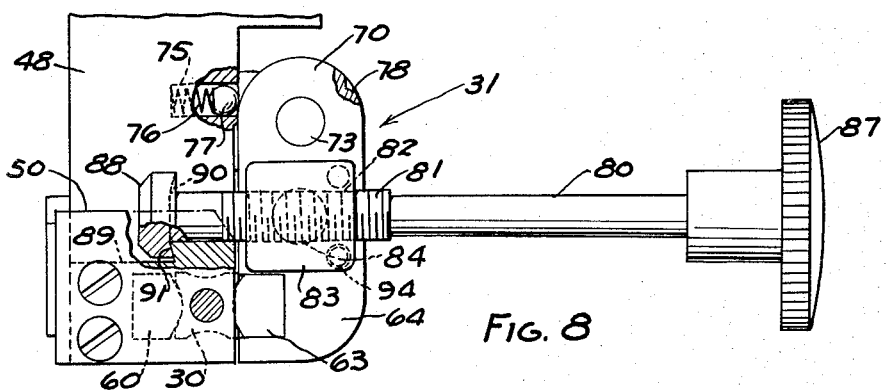
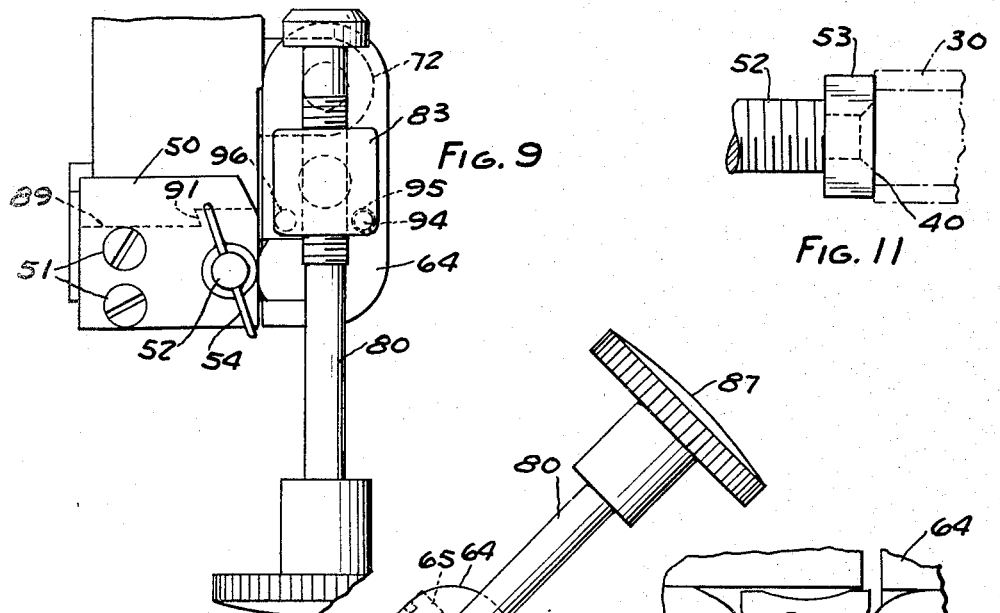
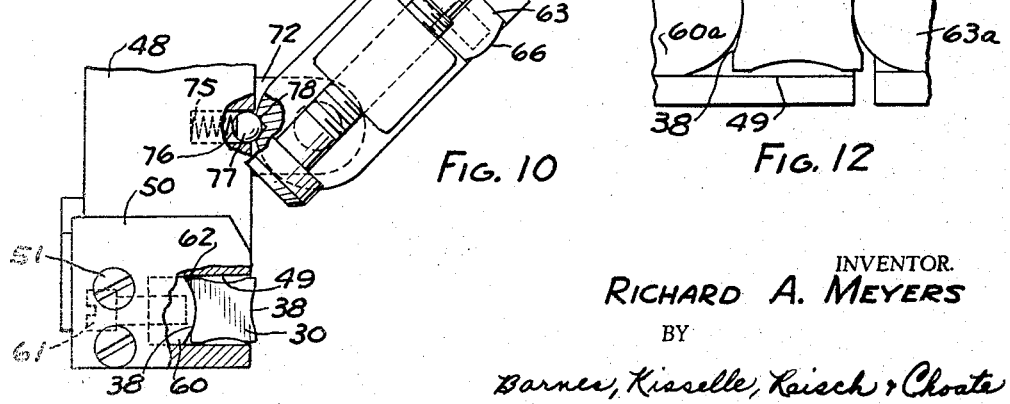
INVENTOR.
RICHARD A. MEYERS
BY
Barnes, Kisselle, Raisch & Choate
ATTORNEYS United States Patent Office 2,959,842
Patented Nov. 15, 1960

2,959,842

TUBE SCARFING DEVICE

Richard A. Meyers, Hometown, Pa., assignor to Bundy Tubing Company, Detroit, Mich., a corporation of Michigan Filed Dec. 6, 1957, Ser. No. 701,194

7 Claims. (Cl. 29—98)

Various features of the scarfing device of present invention adapt it particularly well for removing irregularities from exterior surfaces of relatively long lengths of tubing, wire, or the like, especially where the workpiece has a rounded external shape.

A good example of an application of the invention is in scarfing weld flash from the exterior of welded steel tube as it moves away from the welder and at a location where the tube is still relatively hot. Under these conditions a diamond tool cannot be used because the heat tends to soften the metal matrix and the diamond pulls out of its mount. Ceramic tools have been found generally unsatisfactory because hammering action of the flash tends to crack or chip them. Consequently, the tool must be made of a tool steel or a carbide such as tungsten carbide and these tools must be sharpened from time to time. This necessitates periodic stopping of the tube mill to replace the tool with an attendant loss of production during bringing the mill to a stop, replacing the tool, restarting the mill, and adjusting the new tool.

Heretofore, scarfing tools used have tended, under certain circumstances, to bite into the tube and stop its progress resulting in a pile up of scrap between the welder and scarfing tool. Also in known devices, an operator is responsible for setting the tool and the human operator tends to err on the side of adjusting for too deep a cut, thus aggravating the biting in and stoppage problem mentioned above. Known scarfing tools form a flat on the tube exterior which in some cases is objectionable, and it is relatively difficult and costly to keep the tools in sharpened condition.

The general object of the present invention is to provide a relatively simple, inexpensive scarfing device in which the design of the tool bit and its mount eliminate or greatly diminish the above difficulties. The invention is carried out generally by providing a tool formed of an elongate bar of tungsten carbide or the like, the bar having cylindrical recesses in its sides which intersect a perpendicular end face to form a number of circular cutting edges. The recesses also provide holds by which rounded clamping elements can engage the sides of the tool to hold it in scarfing position. The tool is held with its longitudinal axis acutely angled to the tube axis so that a negative rake angle is provided which eliminates the tendency of the tool to bite into the tube.

The tool holder has a gate on which one of the clamping elements is secured and which swings aside to facilitate access to the bit from a side of the device so that the bit may conveniently be rotated, turned end for end, or replaced for presenting a new cutting edge to the tube being scarfed. The tool holder remains in adjusted position so that it is not necessary for an operator to readjust the position of the tool after replacement or shifting to a new cutting edge. The tool holder has a mount which is reciprocable along a circular path whose center is at the radial center of the circular cutting edge so that the tool can be selectively shifted arcuately for bringing different parts of a cutting edge into tube scarfing position. One form of the invention is shown in the accompanying drawings.

Figure 1 is a diagrammatic representation of a tube mill with which the scarfing device of this invention is used.

Figure 2 is an enlarged perspective view of a cutting tool made in accordance with this invention.

Figure 3 is an enlarged fragmentary partially diagrammatic view illustrating the scarfing bit in operation.

Figure 4 is an end view illustrating use of the scarfing bit.

Figure 5 is a view similar to Figure 4 but showing the scarfing bit swung to different rotative positions for bringing different portions of a cutting edge into tube scarfing position.

Figure 6 is generally a side elevation of the device of this invention with parts broken away and parts shown in phantom to illustrate structure.

Figure 7 is an end view of the device shown in Figure 5.

Figure 8 is an elevational view somewhat enlarged, taken in the direction of arrow 8 in Figure 6.

Figure 9 is a view similar to Figure 8 illustrating a step in opening the tool bit clamp.

Figure 10 is similar to Figures 8 and 9 and illustrates the clamp in opened position.

Fig. 11 is an enlarged fragmentary view illustrating detail of a backing screw for the bit.

Figure 12 is an enlarged, fragmentary, partly diagrammatic view illustrating an alternate form of clamping element for the tool bit.

Figure 1 illustrates a conventional tube mill 20 which transversely rolls flat strip stock 21 drawn from a coil 22 into tubular form as at 23. Tube 23 passes through a welder 24 illustrated as being an electric resistance type welder, and then passes to a scarfing device 25 according to this invention which removes weld flash 26 from the welded tube 27. The scarfing device includes a tool or bit 30 supported by a holder 31 secured on a mount 32 horizontally movably supported on a member 33 in turn movable vertically on a stationary frame member 34 such as by turning a hand wheel 35 at the end of the screw 36 as generally represented in Figure 1. Tube 27 is backed up against the downward force of tool 30 by a member 37.

Cutting tool or bit 30 preferably has the form of an elongate bar of relatively hard material such as tungsten carbide or tool steel having curved concavities or recesses 38 extending longitudinally along its sides. These recesses preferably have circular cylindrical shape and are preferably identical. Tool 30 has end faces 39 and 40 lying in planes perpendicular to the axes of concavities 38 and the concavities intersect the end faces to form at each end of the tool a plurality of circular cutting edges 41—44. The number of recesses 38 may be vared but they are arranged in a number of pairs with the recesses of each pair being disposed preferably symmetrically on opposite sides of the center of the tool. The cutting edges have radii greater than the radius of curvature of the outer diameter of tube 27 for a purpose to be described.

Tool holder 31 includes a body or block 48 having a recess 49 adjacent its lower portion for receiving tool 30. This recess opens at the forward lowermost portion of block 48 so that tool 30 may project outwardly of the recess into scarfing engagement with tube 27 (Fig. 6). The rearward end of recess 49 is closed by a plate 50 secured to body 48 by bolts 51. Plate 50 has an opening threaded for receiving a screw 52 having a swivel-mounted square nose 53 (Fig. 11), which nonrotatably engages the rearward end which may be end 40 of tool 30 in recess 49. Screw 52 is preferably equipped with a wing head 54 facilitating turning of the screw. The forward end of recess 49 is partially closed by a chip control blade 56 secured to body 48 by bolts 57 which pass through a slot 58 in the blade, facilitating its vertical adjustment. Screw 52 and blade 56 serve to clamp tool 30 longitudinally in place within slot 49.

The lateral inner extremity of recess 49 contains a clamping element 60 secured in place by a screw 61 and having an exposed cylindrically curved surface 62 for clamping engagement with a recess 38 in a tool 30. A complementary clamping element 63 is secured to a swinging gate member 64 by a screw 65. Clamping element 63 has an exposed cylindrically curved surface 66 for clamping engagement with a side recess 38 in tool 30 opposite to the recess engaged by element 60. Clamping elements 60 and 63 are illustrated in tool clamping position in Figure 8 and diagrammatically in Figure 4. The curved clamping surfaces of the elements have radii of curvature which are no greater than and preferably smaller than the radii of curvature of tool recesses 38 as illustrated in Figure 8. Figure 12 illustrates the use of clamping elements 60a and 63a similar to 60 and 63 but having clamping surfaces of considerably smaller radii or curvature.

Gate 64 has projections 70 and 71 rotatably secured to a lug 72 on block 48 through a pintle 73. Block 48 has a pocket 75 containing a spring 76 and a ball 77 cooperating with a recess 78 on gate projection 70 to form a detent for securing gate 64 in its open position illustrated in Figure 10. An operating handle 80 for gate 64 has a threaded portion 81 engaging the threaded interior of an opening 82 extending through the head 83 of a pin 84 pivotally secured in an opening 85 extending through gate 64 by such means as a shouldered screw 86. Operating handle 80 may have a hand knob 87 at one end and at its other end is provided with a head 88 laterally removably insertable into a slot 89 in plate 50 (Figure 8). Head 88 has a conical recess 90 on its under side for clamping engagement with a shoulder 91 in slot 89, the shoulder having a shape complementary to recess 90.

Gate 64 has a pocket containing a spring pressed ball 94 (Figure 6) which cooperates with recesses 95 and 96 in pivoting head 83 to provide a detent arrangement yieldably securing operating handle 80 in the rotative positions relative to gate 64 illustrated in Figures 8 and 9.

Tool holder body 48 has an extension 100 (Figure 6), which is secured within a recess 101 in a carrier element 102 of tool holder mount 32 by means of a screw 103 and a screw 104 threaded in carrier 102 and engaging laterally against extension 100. A lug 105 bolted to carrier 102 is provided for further laterally supporting tool holder body 48 as shown. Carrier 102 has an arcuate portion 108 which fits movably in an arcuate slot defined by side walls 109, 110, and 111, in the body of tool holder 32.

Carrier 102 is secured within its slot by a plate 113 bolted to body 112 as at 114 and has an arcuate portion 116 threaded for engagement by a threaded portion 117 of a shaft 118 journaled in tool holder body 112 as at 119. Shaft 118 has an external extension 120 preferably provided with an operating handle 121. The center of the radii of arcuate portion 108, arcuate threaded portion 116, and the arcuate slot in tool holder body 32 all coincide with the center of radius of the cutting edge of tool 30 when the latter is in position for scarfing tube 27.

Tool holder body 112 has a dove-tail extension 124 engaging in complementary horizontally extending ways 125 in member 33. A gib 126 may be interposed between the dove-tail extension and ways. A screw connection (not shown) is preferably provided between dove-tail 124 and member 33 which may be operated through a shaft 127 and attached hand wheel 128 for horizontally adjusting the position of tool holder 32 and tool 30. Member 33 is movable vertically on frame 34 by suitable mechanism as illustrated generally by screw 36 and hand wheel 35 (Figure 1).

In use, it may be assumed that tube mill 20 and welder 24 are in operation and that scarfing device 25 has been adjusted so that a cutting edge such as edge 43 is positioned for scarfing weld flash 26 from tube 27. Tool 30 engages tube 27 preferably at a relatively short distance downstream of welder 24 and the tube at this point may be at a temperature of from about 500° F. to about 600° F. In its operative position, tool 30 has been inserted in tool holder recess 49 with its forward end abutted against chip control blade 56 which has been properly adjusted by shifting it generally vertically as permitted by slot 58 and then tightening screws 57. Back-up screw 52 has been advanced so that its nose 53 firmly abuts the rearward end of tool 30. Gate 64 has been closed, head 88 on shaft 80 engaged with shoulder 91, and shaft 80 retracted to securely clamp elements 60 and 63 against opposite recesses 38 in the sides of tool 30. This position of the parts is illustrated in Figures 6, 7, and 8.

The curved faces 62 and 66 of clamp elements 60 and 63 respectively engage the portions of recesses 38 which are closest to each other. Tool 30 can not move vertically as the drawings are viewed because to do so, clamping elements 60 and 63 would have to be spread apart and this is prevented by the secure locking action of interengaged head 88 and shoulder 91. Longitudinal movement of the tool is prevented by the clamping action of backup screw 52 and chip control blade 56.

Thus the tool is securely fixed in place by engagement of various elements with its ends and with only two sides. It is unnecessary to provide clamping means at the top and bottom sides of the tool. This makes it possible to utilize a tool 30 having the form of a relatively long bar and makes it possible to position this bar so that its longitudinal axis lies at a very small angle to the longitudinal axis of tube 27, for example, of the order of about 10° as illustrated in the drawings. This in turn makes it possible to dispose the tool at a desired negative rake angle to the tube.

Heretofore, tube scarfing has been accomplished by utilizing a conventional scarfing blade having an edge disposed at a positive rake angle with a resulting tendency of the blade to bite down into the tube and a consequent piling up of scrap between the welder and scarfing blade before the tube mill could be stopped. This situation has been aggravated by the fact that the weld flash is uneven and sometimes contains relatively hard portions which increase the tendency of the scarfing blade to dig in. The negative rake angle of the cutting edge provided by the present invention eliminates entirely the tendency of the scarfing tool to bite into the tube.

Another factor aggravating the tendency of prior scarfing blades to bite into the tube is the fact that in previous structures a human operator had to adjust the position of the scrafing blade by feel and the natural tendency has been to err on the side of adjusting the blade to cut too deeply to make sure of obtaining a deep enough cut. The present invention counteracts this tendency both by providing the negative rake angle and by providing positive means for properly positioning the tool as will be seen in greater detail below.

One portion of a cutting edge can be used in scrafing tube moving at the rate of about 150 to 200 feet per minute for a period of about 5 minutes. With the present invention, when it is necessary to bring a new cutting edge into position for scarfing it is only necessary while the tube mill and welder continue operation to turn handle 121 for rotating shaft 118 and swinging arcuate portion 108 of carriage 102 a predetermined amount. This, through tool holder 32, rotates tool 30 about the center of radius of the cutting edge 41—44 which happens to be engaged with tube 27 to bring a new portion of the cutting edge into operative scarfing position. New portions of a cutting edge can be brought into operation periodically as required by merely turning handle 121 to shift the tool. Various positions to which the tool can be shifted for this purpose are illustrated in Figures 4 and 5. A single cutting edge is usable for scarfing from about 13,000 to about 26,000 feet of tube.

When it is necessary to change a cutting edge, the tube mill is stopped, gate 64 is opened, back-up screw 52 is retracted slightly by turning wing head 54, and tool 30 may then be easily slipped out of its recess 49, rotated 90°, and reinserted in the recess. Back-up screw 52 is again tightened and gate 64 closed and clamped, and the tube mill restarted. There is no necessity for adjustment at this time of the position of the tool.

Gate 64 is designed for rapid, convenient opening and closing. Hand wheel 87 is turned to disengage recess 90 on head 88 from shoulder 91. Handle 80 is then swung downwardly to the Figure 9 position where detent ball 94 snaps into recess 95 on the under side of block 83. Handle 80 is then swung upwardly and block 83, because of the detent connection with gate 64, brings gate 64 upwardly with it to the Figure 10 position, thus exposing tool 30. In this upward swinging gate 64 and handle 80 rotate about gate pivot 73 until ball detent 77 snaps into recess 78 on gate projection 70. After tool 30 has been shifted as described, handle 80 is again swung downwardly to the Figure 9 position and swung upwardly so that head 88 enters recess 89. Ball detents 77 and 94 release to permit these movements of the handle. Knob 87 is turned to draw the underside of head 88 again into tight engagement with shoulder 91 to securely clamp elements 60 and 63 against the tool.

Only about one-half minute or less is required to open gate 64, shift tool 30 to bring a new cutting edge into scarfing position and close gate 64 in the manner described to be ready for resumed operation. The tube mill may then be restarted and no time is lost in adjusting the tool to proper scarfing position. The only production time lost is the time required to bring the tube mill to a halt, the half minute or less required to change the tool, and the time required to bring the tube mill back up to normal operating speed. The invention greatly decreases the amount of time required for changing a tool while the mill is halted and eliminates the necessity after the mill has been restarted and brought up to speed of adjusting the tool by trial and error. Heretofore, this adjusting period has required about two minutes and the product made during that time could not be sold as first quality tube.

Tool 30 has eight cutting edges, four on each end. Consequently, a single tool 30 can be used to scarf from about 104,000 to about 208,000 feet of tube. During all of this time, it is necessary only to periodically rotate the tool 90° within recess 49 or to turn it end for end in its recess. Virtually no adjustment of the position of the tool is required during its entire life other than turning hand wheel 121 from time to time as required. The entire arcuate length of each of the eight cutting edges on a tool is used before it need be replaced by another tool. Ordinarily if a tool 30 is replaced by a similar tool, operation of the mill can be resumed even then without further adjustment of the scarfing device. To replace a tool 30, gate 64 is opened, backing screw 52 is retracted, tool 30 removed from slot 49, a new tool inserted, back-up screw advanced, and gate closed and clamped in the manner described.

It has been found that tools 30 having recesses 38 and cutting edges 41—44 of a predetermined radius can be used in scarfing tubes of different diameter. For one example, a tool having a cutting edge radius of 5/8 of an inch can be used for scarfing tubing having an outer diameter of from 1/4 inch to 7/16 inch. When the device is used in connection with tube having different outer diameters, it will be necessary to adjust the vertical position of tool 30. This is done by turning hand wheel 35 to raise or lower support 33 for mount 32 and tool holder 31. Any necessary horizontal adjustment of the tool is accomplished by turning hand wheel 128 to shift dove-tail extension 124 on the tool holder mount in a horizontal direction. After these initial adjustments, use of the device may proceed virtually without further adjustment as described.

The concave curvature of the cutting edges of the tool eliminates to a certain extent flats which were produced at the scarfed area by tools used heretofore.

The initial cost per cutting edge of tools according to the present invention is about 1/4 the cost per cutting edge of tools used prior to this invention. Moreover, the cost of resharpening tools 30 is far less than the cost of resharpening previous tools. Previously, scarfing tools had to be ground on two surfaces to sharpen a cutting edge and the labor required one man's time for about 11 minutes. The edges of tools 30 can be sharpened by placing 50 or more tools in a lapping machine and to sharpen both ends of the 50 tools requires about 15 minutes of one man's time. Tools 30 presently used have about 1 1/2 inches usable length whereas previous type tools had about 5/8 inch usable length. Tools 30 too short to be used individually are brazed together end to end to provide a new tool of adequate length. All factors taken into consideration, the over all cost per cutting edge obtainable from a tool 30 is somewhat less than 1/10 the over all cost per cutting edge obtainable from prior tools.

I claim:

1. A tool for scarfing the exterior of tubing or the like comprising, a bit having an end portion and having side portions with concavities intersecting said end portion to form a plurality of curved cutting edges, a holder in which said bit is disposable in different positions for selectively presenting said cutting edges to a tube to be scarfed, said holder including a relatively stationary means and a means forming a swinging clamp having a rounded element engaging one of said concavities for securing said bit in tube scarfing relation when said clamp is swung to closed position, said rounded element disengaging said concavity when said clamp is swung to an open position, and clamp operating means which includes a shaft threadedly connected on said clamp and cooperable with a portion of said stationary means upon turning said shaft about its axis to fasten said swinging clamp in bit clamping position, said shaft also having a pivoted connection on said swinging clamp so that said shaft can be swung to different positions relatively to said clamp when said shaft is disengaged from said stationary means, and detent means yieldably securing said shaft against pivoting movement relative to said clamp whereby to facilitate opening and closing said clamp by swinging said shaft and clamp together and swinging said shaft relative to said clamp to and from a position for engagement with said stationary means.

2. The combination defined in claim 1 wherein said shaft extends laterally of said bit when in bit clamping position, said pivotal mount of said shaft and said detent means being arranged so that said shaft, in order to open said clamp means, is first swung in one direction about its pivotal mount until said detent means functions and said shaft is swung in the opposite direction about the pivot axis of said clamp to open the same.

3. A tool for scarfing the exterior of tubing or the like comprising, a bit having the form of a solid bar, said bar having a plurality of pairs of recesses in its sides which extend longitudinally of said bar, said recesses lying on substantially circular cylindrical surfaces, the recesses of each pair being disposed on diametrically opposite sides of a longitudinal central axis of said bar, said bar having end faces at its opposite ends, said end faces being substantially perpendicular to said axis and intersecting said recesses at right angles to provide a plurality of circular continuous cutting edges at each end of the bar, a pair of clamping elements, each having portions lying on a surface which is rounded on a radius smaller than the radius of said recesses, means operable to clampingly engage said elements selectively against the recesses of said pairs with said portions engaging said recesses along substantially parallel lines of contact, said lines of contact lying on the portions of the engaged cylindrical recess surfaces which are nearest each other, said means through said elements exerting clamping force in substantially diametrically opposite directions on said bar, said means also being operative to fix the relative positions of said elements when they are engaged against said recesses whereby to fix said bar against movement relative to said clamping means, and means mounting said clamping means with said bar in a position adjacent a tube to be scarfed and with a circular cutting edge defined by a recess other than those clamped by said elements positioned for engaging said tube, said tube in said position thereof having its axis extending substantially in a plane containing the longitudinal axis of the tube, said bar axis being disposed at an angle of the general order of about 10° to said tube axis, said clamping means including means operable to remove at least one of said elements from the proximity of said bar and thereby expose said bar along one entire side thereof, whereby to facilitate access to said bar for manipulating and replacing said bar while said mounting means remains positioned with respect to said tube.

4. A tool for scarfing the exterior of tubing or the like comprising, a bit having the form of a solid bar, said bar having a plurality of pairs of recesses in its sides which extend longitudinally of said bar, said recesses lying on substantially circular cylindrical surfaces, the recesses of each pair being disposed on diametrically opposite sides of a longitudinal central axis of said bar, said bar having end faces at its opposite ends, said end faces being substantially perpendicular to said axis and intersecting said recesses at right angles to provide a plurality of circular continuous cutting edges at each end of the bar, a pair of clamping elements, each having portions lying on a surface which is rounded on a radius smaller than the radius of said recesses, means operable to clampingly engage said elements selectively against the recesses of said pairs with said portions engaging said recesses along substantially parallel lines of contact, said lines of contact lying on the portions of the engaged cylindrical recess surfaces which are nearest each other, said means through said elements exerting clamping force in substantially diametrically opposite directions on said bar, said means also being operative to fix the relative positions of said elements when they are engaged against said recesses whereby to fix said bar against movement relative to said clamping means, and means mounting said clamping means with said bar in a position adjacent a tube to be scarfed and with a circular cutting edge defined by a recess other than those clamped by said elements positioned for engaging said tube, said mounting means being operable to swing said clamping means and bar reciprocably through an arc having a radial center coinciding with that of the curved cutting edge positioned in scarfing relation to the tubing, whereby to scarfingly engage different portions of said cutting edge against said tubing.

5. A tool for scarfing the exterior of tubing or the like comprising, a bit having the form of a solid bar, said bar having a plurality of pairs of recesses in its sides which extend longitudinally of said bar, said recesses lying on substantially circular cylindrical surfaces, the recesses of each pair being disposed on diametrically opposite sides of a longitudinal central axis of said bar, said bar having end faces at its opposite ends, said end faces being substantially perpendicular to said axis and intersecting said recesses at right angles to provide a plurality of circular continuous cutting edges at each end of the bar, a pair of clamping elements, each having portions lying on a surface which is rounded on a radius smaller than the radius of said recesses, means operable to clampingly engage said elements selectively against the recesses of said pairs with said portions engaging said recesses along substantially parallel lines of contact, said lines of contact lying on the portions of the engaged cylindrical recess surfaces which are nearest each other, said means through said elements exerting clamping force in substantially diametrically opposite directions on said bar, said means also being operative to fix the relative positions of said elements when they are engaged against said recesses whereby to fix said bar against movement relative to said clamping means, and means mounting said clamping means with said bar in a position adjacent a tube to be scarfed and with a circular cutting edge defined by a recess other than those clamped by said elements positioned for engaging said tube, said tube in said position thereof having its axis extending substantially in a plane containing the longitudinal axis of the tube, said bar axis being disposed at an angle of the general order of about 10° to said tube axis, said mounting means being operable to swing said clamping means and bar reciprocably through an arc having a radial center coinciding with that of the curved cutting edge positioned in scarfing relation to the tubing, whereby to scarfingly engage different portions of said cutting edge against said tubing while the said disposition of said bar axis relative to the tube axis is maintained.

6. A tool for scarfing the exterior of tubing or the like which is moving in a longitudinal direction comprising, a bit having the form of a solid bar, said bar having a plurality of pairs of recesses in its sides which extend longitudinally of the bar, said recesses lying on substantially cylindrical curved surfaces, the recesses of each pair being disposed on diametrically opposite sides of a longitudinal central axis of said bar, said bar having end faces at its opposite ends extending in substantially flat planes transverse to said axis, said planes intersecting said surfaces to define at each of said end faces a plurality of curved continuous cutting edges, a holder including clamping elements engageable selectively in said pairs of recesses for holding said bit, said clamping elements having fixed relative positions when engaged against said bit to fix said bit against movement relative to said clamping elements, means forming a mount supporting said clamping elements in such a position that when said bit is held thereby it extends in the general direction of movement of the tube but angled thereto with one of said cutting edges positioned for scarfing engagement with the tube at a negative rake angle, and means operable to rock said mount in a curved path determined so that different portions of said cutting edge are brought into scarfing engagement with the tube or the like responsive to shifting of said mount.

7. A tool for scarfing the exterior of tubing or the like which is moving in a longitudinal direction comprising, a bit having the form of a solid bar, said bit having a plurality of pairs of recesses in its sides which extend longitudinally of said bar, said recesses lying on substantially circular cylindrical surfaces, the recesses of each pair being disposed on diametrically opposite sides of a longitudinal central axis of said bar, said bar having end faces at its opposite ends extending in substantially flat planes perpendicular to said axis and intersecting said surfaces to define at each of said end faces a plurality of substantially circular continuous cutting edges, a holder including clamping elements engageable selectively in said pairs of recesses for holding said bit, said clamping elements having fixed realtive positions when engaged against said bit to fix said bit against movement relative to said clamping elements, means forming a mount supporting said clamping elements in such a position that when said bit is held thereby it extends in the general direction of movement of the tube but angled thereto with one of said cutting edges positioned for scarfing engagement with the tube at a negative rake angle, and means operable to rock said mount in a substantially circular path around the radial center of said cutting edge, whereby to shift different portions of said cutting edge into scarfing engagement with the tube or the like.

References Cited in the file of this patent

UNITED STATES PATENTS

| | | |
|---|---|---|
| 1,361,851 | Hall | Dec. 14, 1920 |
| 1,855,971 | Kilmer | Apr. 26, 1932 |
| 2,608,138 | Tener | Aug. 26, 1952 |
| 2,651,223 | Hahn | Sept. 8, 1953 |

FOREIGN PATENTS

| | | |
|---|---|---|
| 230,811 | Great Britain | June 25, 1925 |
| 394,779 | Great Britain | July 6, 1933 |
| 484,239 | Italy | Sept. 7, 1953 |